UNITED STATES PATENT OFFICE.

RALPH H. McKEE, OF NEW YORK, N. Y.

PROCESS FOR ALLOYING ZIRCONIUM AND IRON.

1,401,266.     Specification of Letters Patent.     Patented Dec. 27, 1921.

No Drawing. Application filed February 28, 1919, Serial No. 279,861. Renewed March 29, 1921. Serial No. 456,692.

*To all whom it may concern:*

Be it known that I, RALPH H. McKEE, a citizen of the United States, residing at New York, in the county of Bronx, State of New York, have invented certain new and useful Improvements in Processes for Alloying Zirconium and Iron; and I do hereby declare the following to be a full, clear, and exact description of the invention, such as will enable others skilled in the art to which it appertains to make and use the same.

My present invention relates to an improved process for manufacturing alloys of iron and zirconium, applicable to the combination of zirconium with any of the commercial forms of iron or steel.

Prior processes for these purposes have involved the use of various reagents, which must either be eliminated, or else become a source of disadvantage in the finished product. The present invention rests upon my discovery that zirconium can be alloyed successfully with iron in its various commercial forms by merely adding zirconium oxid in due excess to the molten iron or steel, without the use of fluxes or other reagents. This process has the advantage of the utmost simplicity, and avoids the difficulties due to the presence of reagents remaining in the final product.

As an example of a specific formula for the manufacture of a zirconium steel having a low percentage of zirconium, I add to the molten iron or steel at the temperature of the furnace a sufficient quantity of zirconium oxid to supply an amount of zirconium representing about one per cent. of the weight of the resultant steel, making sure that the zirconium becomes properly diffused through the mass, by stirring or otherwise. There will thus be produced a zirconium steel containing approximately 0.3 per cent, of zirconium. By addition of correspondingly larger proportions of zirconium oxid, steels containing considerably larger percentages of zirconium can be produced. In any case, approximately the proportion of excess of zirconium above indicated should be employed, and to get the best results it is advisable to carry out the process at a temperature in excess of that barely requisite for fusion.

As another example of a modification of my process, wherein higher percentages of zirconium are combined in the final product, I may add to one hundred parts of molten cast iron, seventy parts of zirconium oxid, which should be treated as above described. This will produce an alloy containing about twenty per cent. of zirconium. In any case a sufficient excess of iron is used to separate the oxygen from the zirconium oxid. The resulting iron oxid separates as a slag, combining in part with the silica impurity of the crude ore and in part with a portion of the zirconium oxid.

It is not essential that a perfectly pure zirconium oxid be used, as certain impurities may, in some cases, be tolerated. For instance, the native zirconium oxid known as Baddeleyite, containing a proportion of silica as an impurity may be used in this connection, having due regard to the proportion of zirconium supplied to the mixture. The proportions of silica vary considerably in Baddeleyite, and where this proportion is large, the process described in my pending application for U. S. Patent Serial Number 271,737 wherein the ore is heated with iron and lime, or iron, lime and fluorspar will be more appropriate, but, where the proportion of silica is small, the simpler process herein described has distinct advantages.

What I claim is—

The process of alloying zirconium with iron, which consists in mixing zirconium oxid, free from flux or other reagent, directly with the iron at a temperature above the melting point thereof and in the presence of a sufficient excess of iron to separate the oxygen from the zirconium oxid.

In testimony whereof, I affix my signature.

RALPH H. McKEE.